(12) United States Patent
Yassin

(10) Patent No.: US 7,934,191 B2
(45) Date of Patent: Apr. 26, 2011

(54) METHOD AND MODULES FOR GENERATING CLIENT-SERVER APPLICATIONS

(75) Inventor: Ohad Yassin, Herzeliya (IL)

(73) Assignee: Sap Portals IL, Ràanana (IL)

( * ) Notice: Subject to any disclaimer, the term of this patent is extended or adjusted under 35 U.S.C. 154(b) by 1050 days.

(21) Appl. No.: 11/733,227

(22) Filed: Apr. 10, 2007

(65) Prior Publication Data

US 2008/0256554 A1    Oct. 16, 2008

(51) Int. Cl.
    *G06F 9/44* (2006.01)
(52) U.S. Cl. .................................................... 717/104
(58) Field of Classification Search ............... 717/104
    See application file for complete search history.

(56) References Cited

U.S. PATENT DOCUMENTS

| | | | |
|---|---|---|---|
| 7,496,895 B1* | 2/2009 | Mosterman et al. | 717/124 |
| 7,702,719 B1* | 4/2010 | Betz et al. | 709/203 |
| 2003/0145305 A1* | 7/2003 | Ruggier | 717/100 |
| 2005/0268277 A1* | 12/2005 | Reeder et al. | 717/104 |
| 2005/0273759 A1* | 12/2005 | Lucassen et al. | 717/105 |
| 2006/0143592 A1* | 6/2006 | Bender et al. | 717/104 |
| 2007/0233691 A1* | 10/2007 | Chaushev | 707/10 |
| 2008/0228610 A1* | 9/2008 | Kim et al. | 705/34 |

OTHER PUBLICATIONS

Leff et al. "Web-Application Development Using the ModelNiewlController Design Pattern", 2001, IEEE.*

* cited by examiner

*Primary Examiner* — Philip Wang
*Assistant Examiner* — Junchun Wu

(57) ABSTRACT

A multi-model-view-controller (MMVC) design pattern for generating client-server applications, which overcomes the disadvantages of the MVC design pattern. In an application generated according to the MMVC design pattern initial data is provided by the server model via the controller to the client model. Subsequent data is requested from the server model by the controller and passed to the client model. The initial and subsequent data are fetched according to predetermined rules. The predetermined rules can be based on personal details of the user, such as identity or role, on the server or client computing platforms, on the application, or other factors.

12 Claims, 3 Drawing Sheets

METHOD AND MODULES FOR GENERATING CLIENT-SERVER APPLICATIONS

BACKGROUND OF THE INVENTION

1. Field of the Invention

The present invention relates to applications running in client-server in general, and to a model and methods for constructing such applications in particular.

2. Discussion of the Related Art

The model-view-controller design pattern (MVC) is widely used in constructing applications. The MVC design pattern suggests separating an application into three layers: a model layer which provides a model of the data to be processed and manipulated, a view layer which provides presentation of the data, and a controller layer which coordinates the model and the view. When implementing an application under the object oriented methodology, an object is created which implements each of the three layers, thus receiving the basic functionality of each layer without further effort, so that only domain-specific and application-specific tasks have to be implemented. The model in the MVC design pattern is a domain-specific representation of the information on which the application operates. The model is preferably in communication with a persistent storage, such as a database storing the raw data of the application. The model adds an additional layer beyond the storage, which provides the meaning to the raw data, such as interpreting a first date as a birthday, and a second date as an account opening date. The view layer renders the model into a form suitable for interaction with a user, typically a user interface element. The controller layer processes and responds to events, typically user actions received through the user interface, and may invoke requests or changes on the model in response to the events. For example, web applications are often developed on the basis of the MVC design pattern. In web applications, the view is the code that renders the actual HTML page, the controller is the code that gathers dynamic data and generates the content within the HTML, and the model is represented by the actual content, represented as objects, the raw data of which is usually stored in a database, XML files or any other persistent storage. A typical control flow in an application constructed using the MVC design pattern is as follows: 1. The user interacts with the user interface. 2. The controller handles the input event from the user interface, for example via a registered handler or callback. 3. The controller accesses the model, possibly updating it. 4. One or more views offer a user interface while showing data from the model. Each view receives the data from the model. 5. The user interface is ready for further user interactions, which begin the cycle anew. One of the main advantages of the ARC pattern relates to the option of replacing any of the parts, such as the user interface or the storage (for example database) without affecting the other layers. Thus, it is possible, for example to upgrade any component while avoiding changes in the logic of the applications or other elements which are not replaced.

However, the MVC does not easily offer itself for use in client-server applications. It will be appreciated by a person skilled in the art that in such applications, that it is possible to locate the model, controller or view layers in either the server or one or more client platforms, and that each chosen location implies different implementation difficulties, technical challenges and user experience. Placing the controller and the view layer in the client platform, with which the user interacts, is generally considered good practice. However, placing and executing the model in either the client computing platform or the server computing platform poses significant difficulties. Placing and executing the model on the server platform harms the application's performance, since communication between the client and the server is required for each request or update. In addition, if connection to the server is lost, the application can not function. On the other hand, if the model is placed on the client platform, then various abstraction levels or services should be developed for the model, such as persistency, server abstraction, connectivity and others. As these abstraction level should be handled by the server platform, due to its connection to the storage, placing the model layer in the client platform results in duplicated abstraction layers. This may lead to suboptimal software construction. Additionally, placing the model in either the client or the server poses problems when the model is required to communicate with a multiplicity of servers.

There is thus a need in the art for a method that will enable the development of client-server applications, while maintaining the separation between the model, view and control layers. Such method should enable the development of efficient applications, which do not require intensive communication between the client and the server, while maintaining data integrity even while connection between the client and the server is not available. The method should further enable the construction of client-multi-server applications while offering the same advantages.

SUMMARY OF THE PRESENT INVENTION

It is an object of the present invention to provide a novel design pattern for implementing applications in a client-server environment. The design pattern and applications built using the design pattern split the model of the traditional model-view-controller design pattern into a server model and a client model. The client model stores all data collected from the server model, and stores data changes until the server is available.

In accordance with the present invention, there is thus provided a set of modules for implementing an application used by a user, the application executed in a client-server environment by a client computing platform and a server computing platform, the set of modules including: a server model class providing functionality of communicating with a repository, and supplying initial data and subsequent data retrieved from the repository according to one or more predetermined rules; a view class providing functionality of receiving and supplying the initial data and subsequent data to the user; a client model class providing functionality of issuing one or more requests for initial data and subsequent data, receiving the initial data and subsequent data, keeping the initial data and subsequent data, and supplying the initial data and subsequent data to a view object associated with the view class; and a controller class for providing communication between the view object associated with the view class, a client model object associated with the client model class and a server model object associated with the server model class. Within the set of modules, the one or more predetermined rules are optionally determined based on any one or more elements of the group consisting of: a detail associated with the user, a role of the user, a permission of the user, a privilege of the user, a preference of the user, a geographic location of the client computing platform, a geographic location of the server computing platform, the client-server application, a resource of the client computing platform, memory of the client computing platform, processing power of the client computing platform, a resource of the server computing platform, memory of the server computing platform, processing power of the server computing platform, the repository, and a communication channel between the client computing platform and the server computing platform.

Another aspect of the disclosed invention relates to a method for constructing a client-server application to be used by a user of a client computing platform and executed by the client computing platform and a server computing platform, the method comprising the steps of: generating a server model object, the server model object communicating with a repository, and supplying initial data and subsequent data retrieved from the repository according to an at least one predetermined rule; generating one or more view objects, each view object receiving and supplying the initial data and subsequent data to the user; generating a client model object for issuing one or more requests for initial data and subsequent data, receiving the initial data and subsequent data, keeping the initial data and subsequent data, and supplying the initial data and subsequent data to the view objects; and generating a controller object for communicating with the view object, the client model object and the server model object, for supplying the initial data and the subsequent data from the server model object to the view object according to the at least one predetermined rule. Within the method, the step of generating the client model object optionally comprises the steps of: implementing an initial data request to the controller object and Implementing a subsequent data request to the controller object. The step of generating the controller object can comprise the steps of: implementing a message queue handler; determining an initial data fetching rule; implementing the initial data fetching rule; determining a subsequent data fetching rule; and implementing the subsequent data fetching rule. The initial data fetching rule optionally relates to retrieving information from one or more tables of the repository. The initial data fetching rule can relate to a number of records that should be fetched from an one or more tables of the repository. Within the method, the subsequent data fetching rule optionally relates to retrieving information from one or more tables of the repository or to a number of records that should be fetched from one or more tables of the repository. Within the method, the initial data fetching rule or the subsequent data fetching rule can be determined based on any one or more elements of the group consisting of: a detail associated with the user, a role of the user, a permission of the user, a privilege of the user, a preference of the user, a geographic location of the client computing platform, a geographic location of the server computing platform, the client-server application, a resource of the client computing platform, memory of the client computing platform, processing power of the client computing platform, a resource of the server computing platform, memory of the server computing platform, processing power of the server computing platform, the repository, and a communication channel between the client computing platform and the server computing platform.

Yet another aspect of the disclosed invention relates to a computer readable storage medium containing a set of instructions for implementing an application executed in a client-server environment by a client computing platform and a server computing platform, the set of instructions comprising: a server model class providing functionality of communicating with a repository, and supplying initial data and subsequent data retrieved from the repository according to an at least one predetermined rule; a view class providing functionality of receiving and supplying the initial data and subsequent data to the user; a client model class providing functionality of issuing one or more requests for initial data and subsequent data, receiving the initial data and subsequent data, keeping the initial data and subsequent data, and supplying the initial data and subsequent data to a view object associated with the view class; and a controller class for providing communication between the view object associated with the view class, a client model object associated with the client model class and a server model object associated with the server model class.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The disclosed methods and class collection provide a way of constructing client-server applications, which combines the benefits of constructing and activating the model object of the model-view-controller (MVC) design pattern on the server side of the application, with the benefits of constructing and activating the model object on the client side of the application. In accordance with a preferred embodiment of the disclosed methods and class collection, there is thus provided a multi-model-view-controller (MMVC) design pattern, which suggests two model objects: a client model object activated by the client computing platform, and a server model object, activated by the server computing platform The client model object retrieves and caches segments of data from one or more server model objects via the controller and according to predetermined rules enforced by the controller. The client model object consolidates the data segments into a single data model. The client model notifies the views about changes in the data if these changes are relevant to the specific view, according to the way the view registered itself with the model. Each server model object communicates with the relevant repository, such as the data base on one hand, and with the controller object, which is activated by the client computing platform on the other hand. Data is passed between the client model object and the server model objects through the controller and according to predetermined algorithms. Changes made in the client model are cached within the controller and are controllably passed to the server model and to the repositories. Thus, the disclosed solution saves client-server round trips of data and provides a user with high performance, while maintaining data integrity and ensuring that actions such as transactions are not lost, without re-implementing large parts of the functionality, such as transactability, rollback, persistency and others on the client side.

Figure 1:
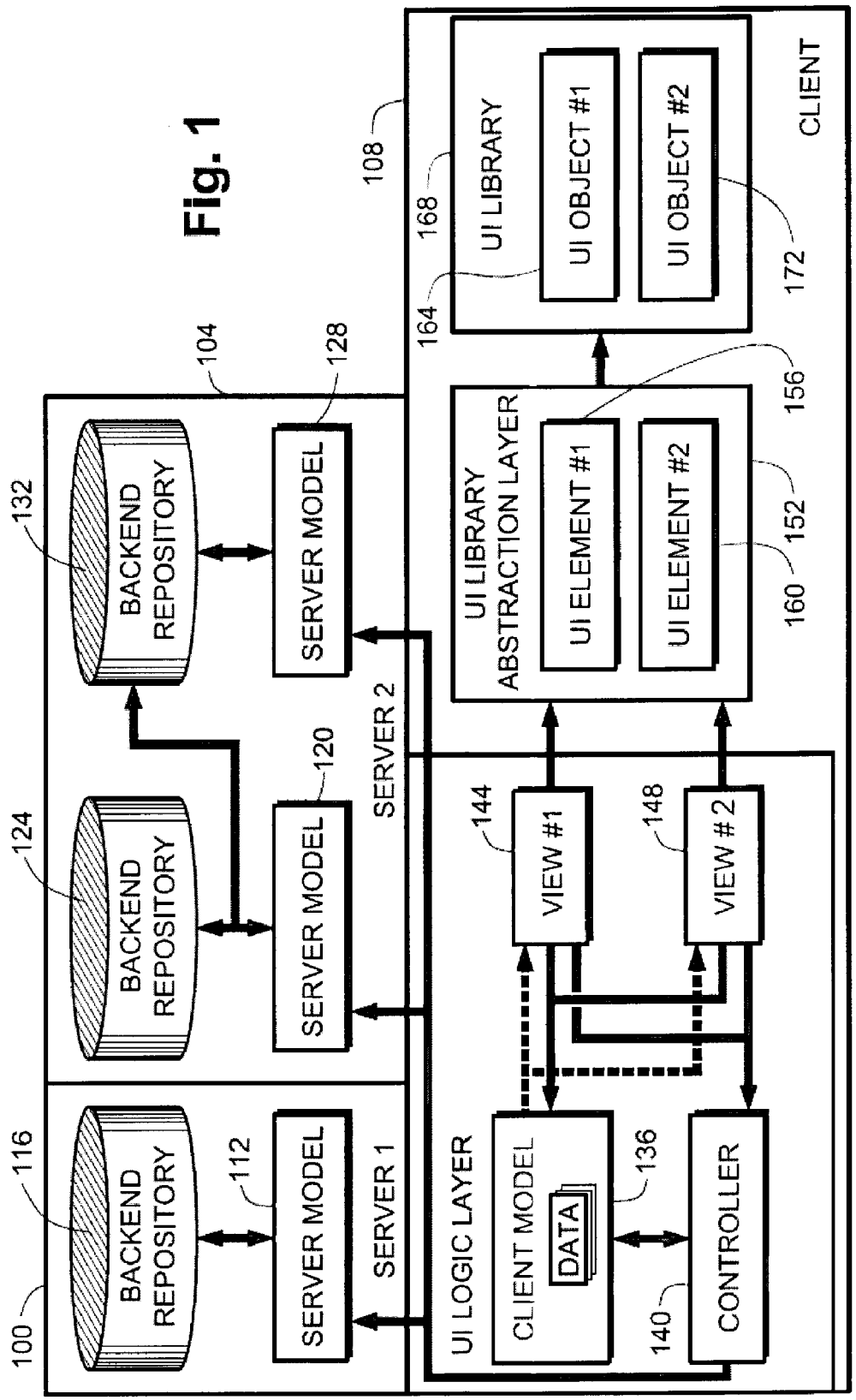
FIG. 1 is a block diagram of the main objects in an application implemented according to a preferred embodiment of the MMVC design pattern.

Referring now to FIG. 1, showing a block diagram of the main objects in an application implemented according to the disclosed design pattern and method. The application is generally used in a client server environment, in which one or more servers, such as server 1 (100) and server 2 (104) provide one or more services to a multiplicity of clients such as client 1 (108). The servers and clients are optionally in geographically apart locations, and are preferably connected by a communication channel, such as a Local Area Network (LAN), Wide Area Network (WAN), the Internet, intranet or the like. Each of the servers and clients is a general purpose processor provisioned with a CPU and memory. Servers 100 and 104 are optionally mainframe computers, personal computers, network computers or the like, executing one or more applications. Each of the clients is preferably also a computing platform, such as a mainframe computer, a personal computer, a network computer, a personal digital assistant (PDA), a cellular phone, or the like. The applications are preferably implemented as one or more sets of computer instructions arranged in one or more modules, static libraries, dynamic link libraries, which interact with one another. The instructions can be written in any one or more programming languages, such as C#, C, C++, Java, VB or others, and under any development environment, such as .NET, J2EE or others. Alternatively, any of the servers or clients can be implemented as firmware ported for a specific processor such as digital signal processor (DSP) or microcontrollers, or as hardware or configurable hardware such as field programmable gate array (FPGA) or application specific integrated circuit (ASIC). If an executed application is a client-server application, then the server side is executed on one or more servers, and the client side is executed on one or more clients. Each server such as server 1 (100) or server 2 (104) optionally comprises a backend repository, such as repository 116 of server 1 (100) and repositories 124 and 132 of server 2 (104). The repository is preferably a database, stored on a storage device for example an optical storage device such as a CD, a DVD, or a laser disk; a magnetic storage device such as a tape or a hard disk; a semiconductor storage device such as Flash device, memory stick, or the like.

Server model objects 112, 120 and 128, client model object 136, controller model object 140 and view model objects 144 and 148 are instantiations of the server model, client model, controller, and view classes, respectively, which are part of the disclosed MMVC model. Preferably, each object is of the corresponding class or of a subclass thereof, and thus inherits or re-implements the functionality of the class as well as application-specific methods.

For each service supported by each server, the application comprises and executes an object which implements the functionality of a server model. The server model object functions as the model object in the traditional MVC model. Thus, server 1 (100) providing a first application constructs and executes server model object 112, while server 2 104 which provides two applications constructs and executes server model object 120 for the first application and server model 128 for the second application. FIG. 1 further comprises an object structure constructed and executed by client 108 when executing a client-side of an application using the disclosed design pattern. Thus, the application executed on client platform 108 comprises User Interface (UI) library 168, which comprises UI object 1 (170) and UI object 2 (172), which represent the actual objects rendered on the display device. The objects in UI library 1 (168) are managed through objects in UI library reference layer 152, which comprises UI element 1 (156) and UI element 2 (160). UI element 1 (156) provides the abstraction level for UI object 1 (170), and similarly for UI element 2 (160) and UI object 2 (172). UI elements are used by one or more views, such as view 1 (144) and view 2 (148) which manipulate those parts of the data to be shown by the UI elements. It will be appreciated by persons skilled in the art that each view preferable constructs its own UI elements and UI objects, but UI elements constricted from the same class and UI objects constructed from the same class can be used in different views. The views communicate with controller object 140, and with client model object 136. Client model object 136 is a reflection of server model object 112 within client 104. The views such as view 1 (144) and view 2 (148) communicate with client model object 136 as they would communicate with the model object if the traditional MVC design pattern was used. Controller object 140 mediates between client model 136 and server models 112, 120 and 128. During construction, and upon demand, client model object 136 fetches data from server model objects 112, 120 and 128, through controller 140. Client model object 136 keeps the data fetched from the server model objects for future use. Controller 140 fetches the data according to predetermined rules, related for example to the initial type and quantity of data to be fetched, continuation type and quantity of data to be fetched, or the like. For example, if the user is permitted to view data from one or more database tables, the initial fetching of the data can bring the latest X records from the relevant tables, and if more data is required, than fetch additional Y records. Then, if the user then needs to see any of the first X records again, they are already present within the data kept within client model 136 and do not have to be re-fetched from a server model over the network. Controller model 140 is thus responsible for fetching data from server models to the client model, from which it is passed to the views, and also for transferring updates from the views and from the client model to the server models.

As an example for the information flow in the system, suppose a number of records from a specific table were initially fetched from the repository to the client model object via a server model. If the user then requests to see additional records, the view requests this information from the controller, the controller communicates with the client model and determines that the information is not available; the controller then requests the information from the server model object, which retrieves the information from the repository; the information is then sent to the client model object for storage; and the view is notified. If the user later requests to view the first records again, the records are already available within the client model and the view can be updated without the client having to communicate with the server.

Figure 2:
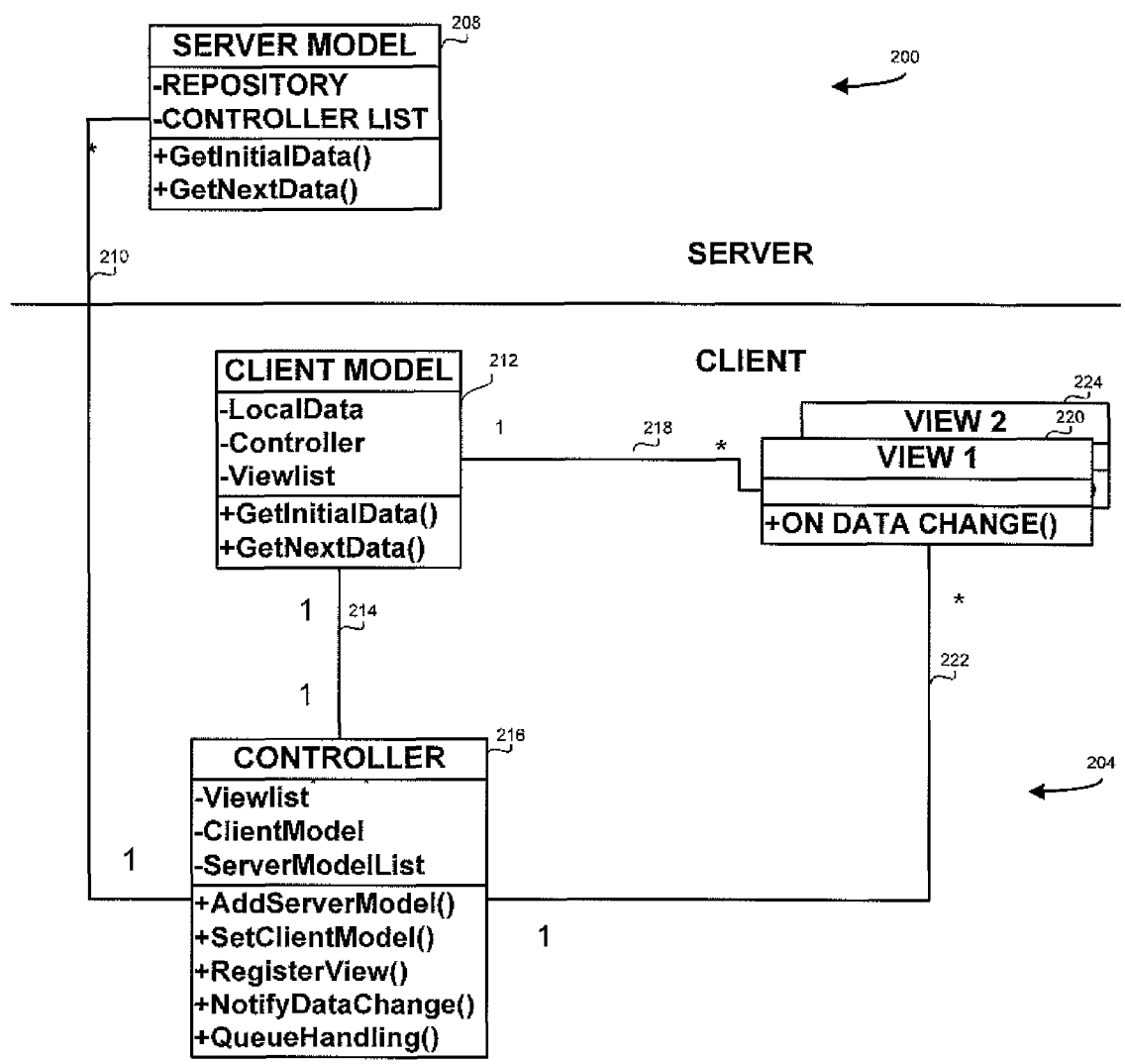
FIG. 2 is a class diagram of the MMVC design pattern.

Referring now to FIG. 2, showing a class diagram of the MMVC design pattern. The MMVC design pattern is preferably implemented when generating a client-server application. The implementation can take the form of inheriting, instantiating, inheriting and instantiating, or otherwise implementing the disclosed classes and their respective data and functionality, preferably in accordance with an object oriented methodology. In order to avoid confusion, functionalities associated with objects, usually referred to as "methods", are hereinafter referred to as "functions".

The class diagram of the MMVC includes a server model class 208 objects of which are typically executed by a server computing platform, generally referenced 200; and client model class 212, controller class 216 and view class 220 objects of which are typically executed by a client computing platform, generally referenced 204. For simplicity, the following description relates to classes. However, it will be appreciated by a person skilled in the art that the actual communication and processing is preferably done by objects of the respective classes or sub-classes thereof.

Controller class 216 generally provides communication between client model class 212, view classes 220 and server model classes 208. Since each controller communicates with a single client model, multiple views and multiple server models, each controller has a 1-1 relationship 214 with a client model, 1:N relationship 222 with views such as view 1 (220) and view 2 (224), and a 1:M relationship 210 with a server model 208. Client model 212 has a 1:P relationship 218 with views such as view 1 (220) and view 2 (224). It will be appreciated that in the context of the disclosed invention, N, M, and P are arbitrary integer numbers. Controller class 216 has attributes, i.e. comprises or points to: ViewList which is a list of the connected views, ClientModel which is the client model connected to the controller, and ServerModelList which is the list of server models connected to the controller. The controller implements the functionality of AddServerModel, for adding a server model to its list, SetClientModel for setting its client model, and RegisterView, i.e. adding a view to the view list. Optionally, when a view registers with the controller, it notifies the controller of the data types or data sets that are of interest to the view, so that each view is notified about a change in the data only if the data is relevant to the view. The controller further has a method of OnNotifyChange in which the server model or the client model informs the controller about data change caused for example by the user of the application, or by change to the data of the server model, and updates the views with the new data, or if the data is updated by the views, sends notifications to the server model and to the client model. The controller also comprises one or more methods for handling a message queue, such as QueueHandling. Queue handling methods are intended for collecting messages and updates for the server model when the connection to the server is lost, and passing the information in order when the connection is resumed. Thus, if the client tries to update the server with changed data when the server is not available, the changes are kept locally on the client and the server is updated later when the connection is resumed. The temporary local storage enables the user to continue working on the system. In a preferred embodiment of the invention, the user is optionally notified that updating the server is delayed, and is optionally notified when the delayed update is performed.

Server model object 208 has the attributes of a Repository, such as a database, and ControllerList which is a collection of controllers. Server model 208 preferably supports the function of GetInitialData for getting the first data batch from the repository, and GetNextData for fetching the subsequent batch of data. Preferably, the controller calls the functions of GetInitialData and GetNextData upon request from the views for this data, in situations when the data is not available in the client model. When the data is fetched, it is passed to the client model and thus becomes available to the views.

Client model 212 has attributes of LocalData, as fetched from the server model and possible changed by the user, possibly a Contorller, and a ViewList of the views reflecting data from the model. Client model 212 also provides the functionality of GetInitialData and GetNextData as server model 208. However, if the data is not available to client model 212, it sends a request to controller 216 which in turn requests the data from one of server models 208. Once the data is received from the server model trough the controller, it is stored within the client model for future use by the views.

The views, such as view 1 (220) and view 2 (224) are similar to the views of the traditional MVC model, since they address their data request to the controller rather than to the model. The views are thus unaware whether the supplied information is already available from the client model or is fetched upon request from the client model using the controller and the server model. Each view provides the functionality of OnDataChange which is called when the data in the client model changes, in order to update the view to reflect the changed information.

It will be appreciated that the class diagram of FIG. 2 shows only the schematic connections and schematic essential data and functionality necessary for implementing the MMVC design pattern, rather than the full details and functionality associated with the classes and objects, which are similar to the details and functionality associated with implementing the traditional MVC design pattern.

Figure 3:
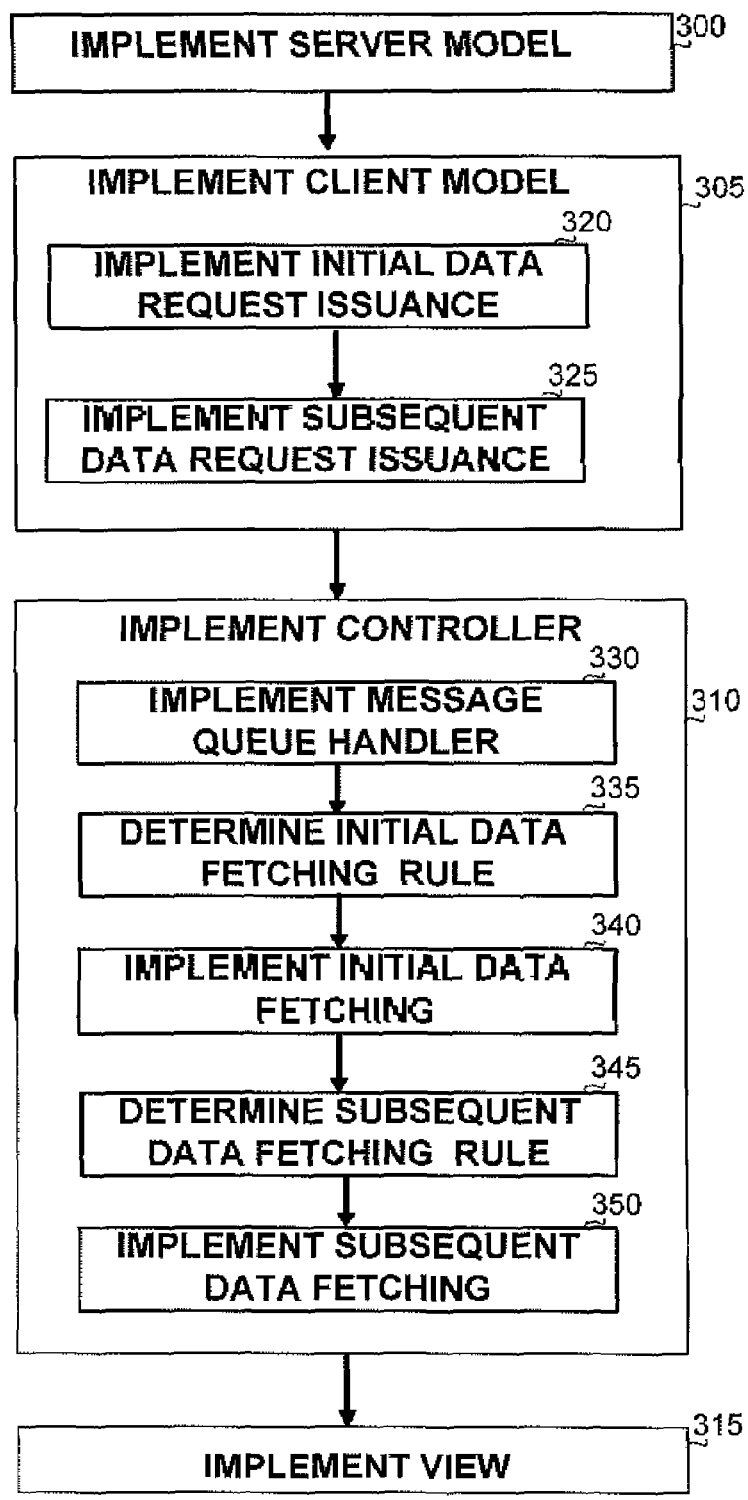
FIG. 3 is a flow chart of the main steps in a method for constructing a client-server application, in accordance with the MMVC design pattern.

Referring now to FIG. 3, showing a preferred embodiment of a method for constructing a client-server application, in accordance with the disclosed model. The method comprises implementing a server model class 300, implementing a client model class 305, implementing a controller class 310 and implementing a view class 315. The classes are implemented according to the traditional MVC model, except for additions which are detailed below. For the client model, the method comprises implementing the functions of GetInitialData on step 320 and GetNextData on step 325. The functions GetInitialData and GetNextData examine the internal model of the data held within the client model, and if the requested data is not available, the client model addresses the controller. The method further comprises implementing a message queue handler step 330, in which the controller manages the event queue and updated that should be notified to the server model. Handling the events and updates is particularly important for semi-connected systems, in which connection to the server is not continuous, while the user needs to keep working on the application. Thus, the controller stores the changes and updates the server when possible. Controller implementation step 310 further comprises initial data fetching rule determination on step 335 and implementation of the rule on step 340. Initial data fetching rule relates to the initial data requested from the server model for the client model, so that a user can start working with the application, without waiting for response from the server. The rule may depend on the user's identity, role, preferences, or other configurable data. For example, it can be determined that for all users tagged as "sales person", the initial data comprises the latest ten records from a "products" table, and the latest fifty records from "sales" table which relate to their sales. Additionally, the user data or preferences, such as area, language, and others can be used for setting the initial data. Controller implementation step 310 comprises also subsequent data fetching rule determination on step 345 and implementation of the rule on step 350. The subsequent data fetching rule determines how to fetch data from the server model beyond the initial data. The rule may relate to how much data should be fetched, at what time intervals, and other factors, and may again relate to the user's identity, role, preferences, and other configuration details. The controller's functions for fetching the initial data and next or subsequent data are preferably called by the client model once it is decided that the client model does not have the requested data, and that such data should be fetched from the server model. The controller is further responsible for receiving update notifications from the server model and for updating the client model, and fro synchronizing between the client model and a multiplicity of server models, if the application involves more than one server model, for example when data from more than one server is required by the application.

It will be appreciated that the order of steps in FIG. 3 is not obliging, and the order of steps can change according to the convenience of the implementer, as long as the user adheres to the requirement of the programming language and development environment.

The disclosed design pattern and model is an extension of the MVC design pattern, which is suitable for implementing client-server applications. Using the disclosed model enables a user to work on the client side of an application, without requiring intensive data fetching from the server, which is time and bandwidth consuming on the one hand, and a total barrier when the server is not available to the client on the other hand. Using the disclosed design pattern requires determining and implementing rules, policies or other guidelines for the initial fetching of data from the server model to the client model and subsequent fetches. The rules or policies optionally relate to the user's identity, role, permissions, privileges, geographic location of the client and the server, application, software, hardware or other resources such as available bandwidth, processing power, memory, on the repository in which the data is stored, on the communication channel between the client and the server, or and any other factor. The initial fetching and subsequent fetching can alternatively relate to data hierarchies. For example, the initial data can be fetched from an initial data set, while subsequent fetching can relate to other data sets. In yet another alternative, the initial fetching and subsequent fetching are determined by the user's behavior. For example, the initial data can be fetched according to the data the user consumed in the previous use of the application, similar to a recently-used mechanism.

It will be appreciated by persons skilled in the art that the present invention is not limited to what has been particularly shown and described hereinabove. Rather the scope of the present invention is defined only by the claims which follow.

What is claimed is:

1. A set of modules for implementing an application used by a user, the application executed in a client-server environment by a client computing platform and at least one server computing platform, the set of modules adapted to the executed by a processor at a computer, the set of modules including:
   a server model class providing functionality of communicating with a repository, and supplying initial data and subsequent data retrieved from the repository according to an at least one predetermined rule;
   a view class providing functionality of receiving and supplying the initial data and subsequent data to the user;
   a client model class providing functionality of issuing an at least one request for initial data and subsequent data, receiving the initial data and subsequent data, keeping the initial data and subsequent data, and supplying the initial data and subsequent data to a view object associated with the view class; and
   a controller class for providing communication between the view object associated with the view class, a client model object associated with the client model class and at least two server model objects associated with the server model class, wherein the view class and the controller class are located at the client computing platform.

2. The set of modules of claim 1 wherein the at least one predetermined rule is determined based on any one or more elements of the group consisting of: a detail associated with the user, a role of the user, a permission of the user, a privilege of the user, a preference of the user, a geographic location of the client computing platform, a geographic location of the at least one server computing platform, a client-server application, a resource of the client computing platform, memory of the client computing platform, processing power of the client computing platform, a resource of the at least one server computing platform, memory of the at least one server computing platform, processing power of the at least one server computing platform, the repository, and a communication channel between the client computing platform and the at least one server computing platform.

3. A method for constructing a client-server application to be used by a user of a client computing platform and executed by the client computing platform and at least one server computing platform, the method comprising the steps of:
   generating at least two server model objects, each server model object communicating with a repository, and supplying initial data and subsequent data retrieved from the repository according to an at least one predetermined rule;
   generating a view object, the view object receiving and supplying the initial data and subsequent data to the user;
   generating a client model object for issuing an at least one request for initial data and subsequent data, receiving the initial data and subsequent data, keeping the initial data and subsequent data, and supplying the initial data and subsequent data to the view object; and
   generating a controller object for communicating with the view object, the client model object and the at least two server model objects, for supplying the initial data and the subsequent data from the at least two server model objects to the view object according to the at least one predetermined rule, wherein the at least two server model objects are associated with at least two servers, wherein the view class and the controller class are located at the client computing platform.

4. The method of claim 3 wherein the step of generating the client model object comprises the steps of:
   implementing an initial data request to the controller object; and
   implementing a subsequent data request to the controller object.

5. The method of claim 3 wherein the step of generating the controller object comprises the steps of:
   implementing a message queue handler;
   determining an initial data fetching rule;
   implementing the initial data fetching rule;
   determining a subsequent data fetching rule; and
   implementing the subsequent data fetching rule.

6. The method of claim 5 wherein the initial data fetching rule relates to retrieving information from an at least one table of the repository.

7. The method of claim 5 wherein the initial data fetching rule relates to a number of records that should be fetched from an at least one table of the repository.

8. The method of claim 5 wherein the subsequent data fetching rule relates to retrieving information from an at least one table of the repository.

9. The method of claim 5 wherein the subsequent data fetching rule relates to a number of records that should be fetched from an at least one table of the repository.

10. The method of claim 5 wherein the initial data fetching rule is determined based on any one or more elements of the group consisting of: a detail associated with the user, a role of the user, a permission of the user, a privilege of the user, a preference of the user, a geographic location of the client computing platform, a geographic location of the at least one server computing platform, a client-server application, a resource of the client computing platform, memory of the client computing platform, processing power of the client computing platform, a resource of the at least one server computing platform, memory of the at least one server computing platform, processing power of the at least one server computing platform, the repository, and a communication channel between the client computing platform and the at least one server computing platform.

11. The method of claim 5 wherein the subsequent data fetching rule is determined based on any one or more elements of the group consisting of: a detail associated with the user, a role of the user, a permission of the user, a privilege of the user, a preference of the user, a geographic location of the client computing platform, a geographic location of the at least one server computing platform, a client-server application, a resource of the client computing platform, memory of the client computing platform, processing power of the client computing platform, a resource of the at least one server computing platform, memory of the at least one server computing platform, processing power of the at least one server computing platform, the repository, and a communication channel between the client computing platform and the at least one server computing platform.

12. A non-transitory computer readable storage medium containing a set of instructions for implementing an application executed in a client-server environment by a client computing platform and at least one server computing platform, the set of instructions comprising:
- a server model class providing functionality of communicating with a repository, and supplying initial data and subsequent data retrieved from the repository according to an at least one predetermined rule;
- a view class providing functionality of receiving and supplying the initial data and subsequent data to the user;
- a client model class providing functionality of issuing an at least one request for initial data and subsequent data, receiving the initial data and subsequent data, keeping the initial data and subsequent data, and supplying the initial data and subsequent data to a view object associated with the view class; and
- a controller class for providing communication between the view object associated with the view class, a client model object associated with the client model class and at least two server model objects associated with the server model class, wherein the view class and the controller class are executed at the client computing platform.

* * * * *